US012807428B2

(12) United States Patent
Liu et al.

(10) Patent No.: US 12,807,428 B2
(45) Date of Patent: Nov. 24, 2026

(54) BIDIRECTIONAL TRANSFER DEVICE, RGV AND LIQUID INJECTION APPARATUS

(71) Applicant: Guangdong Lyric Robot Automation Co., Ltd., Huizhou (CN)

(72) Inventors: Qi Liu, Huizhou (CN); Jiawen Cai, Huizhou (CN); Longfei Hao, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 514 days.

(21) Appl. No.: 18/279,839

(22) PCT Filed: Dec. 19, 2022

(86) PCT No.: PCT/CN2022/140049
§ 371 (c)(1),
(2) Date: Aug. 31, 2023

(87) PCT Pub. No.: WO2024/040812
PCT Pub. Date: Feb. 29, 2024

(65) Prior Publication Data
US 2025/0026585 A1 Jan. 23, 2025

(30) Foreign Application Priority Data
Aug. 25, 2022 (CN) ......................... 202211028257.9

(51) Int. Cl.
*B65G 47/90* (2006.01)
*H01M 50/609* (2021.01)

(52) U.S. Cl.
CPC .......... *B65G 47/90* (2013.01); *H01M 50/609* (2021.01)

(58) Field of Classification Search
CPC ...... B65G 47/90; B65G 35/00; B65G 1/0435; B65G 41/02; B65G 43/00; B65G 2203/04; H01M 50/609; Y02E 60/10
See application file for complete search history.

(56) References Cited

U.S. PATENT DOCUMENTS

| | | | |
|---|---|---|---|
| 5,181,824 | A | 1/1993 | Thomas |
| 5,913,654 | A | 6/1999 | Kaup |
| 2021/0276806 | A1 | 9/2021 | Knepp et al. |

FOREIGN PATENT DOCUMENTS

| | | | |
|---|---|---|---|
| CN | 102219163 | A | 10/2011 |
| CN | 106082016 | A | 11/2016 |

(Continued)

OTHER PUBLICATIONS

CN109502256A—A kind of two-way transfer carriage device of flexibility—Google Patents translated version (Year: 2026).*

(Continued)

*Primary Examiner* — Dean Kwak
(74) *Attorney, Agent, or Firm* — Daylight Law, P.C.

(57) ABSTRACT

A bidirectional transfer device, an RGV and a liquid injection apparatus are disclosed. The bidirectional transfer device includes a bidirectional transfer base, a bidirectional transfer arm assembly, a bidirectional transfer driving assembly, a bidirectional transfer auxiliary assembly, a bidirectional transfer auxiliary driving assembly, a transfer auxiliary fixing assembly and a first transfer positioning sensor. The bidirectional transfer driving assembly drives the bidirectional transfer arm assembly to move along a first direction and a second direction. The bidirectional transfer auxiliary assembly includes a bidirectional auxiliary push-pull component, a bidirectional transfer auxiliary mounting plate and an auxiliary lifting driver, and the bidirectional auxiliary push-pull component is connected to a liquid injection jig. The bidirectional transfer auxiliary driving assembly drives (Continued)

the bidirectional transfer auxiliary assembly to move relative to the bidirectional transfer arm assembly along the first direction and the second direction.

6 Claims, 8 Drawing Sheets

(56) References Cited

FOREIGN PATENT DOCUMENTS

| | | | | | |
|---|---|---|---|---|---|
| CN | 106112851 | A | | 11/2016 | |
| CN | 107322258 | A | | 11/2017 | |
| CN | 109502256 | A | * | 3/2019 | ......... B23K 37/0443 |
| CN | 110350231 | A | | 10/2019 | |
| CN | 110406922 | A | | 11/2019 | |
| CN | 110902288 | A | | 3/2020 | |
| CN | 111129421 | A | | 5/2020 | |
| CN | 211056043 | U | | 7/2020 | |
| CN | 112478575 | A | | 3/2021 | |
| CN | 114148697 | A | | 3/2022 | |
| CN | 114803305 | A | | 7/2022 | |
| CN | 115367403 | A | | 11/2022 | |
| EP | 0002523 | A1 | | 6/1979 | |
| GB | 2092117 | A | | 8/1982 | |
| JP | 2004131231 | A | | 4/2004 | |

OTHER PUBLICATIONS

Supplementary Search Report dated Nov. 12, 2024 from the Chinese Application No. 2022110282579, 3 pages.

First Office Action dated Jul. 3, 2024 from CN Application No. 2022110282579.

First Search dated Jul. 1, 2024 from CN Application No. 2022110282579.

International Search Report and Written Opinion dated Apr. 26, 2023 from International Application No. PCT/CN2022/140049.

* cited by examiner

2100(2101, 2102, 2103)

BIDIRECTIONAL TRANSFER DEVICE, RGV AND LIQUID INJECTION APPARATUS

CROSS-REFERENCE TO RELATED APPLICATIONS

This application is a national stage filing under 35 U.S.C. § 371 of international application number PCT/CN2022/140049, filed Dec. 19, 2022, which claims priority to Chinese patent application No. 202211028257.9 filed Aug. 25, 2022. The contents of these applications are incorporated herein by reference in their entirety for all purposes.

TECHNICAL FIELD

The disclosure relates to the technical field of lithium battery production apparatuses, and in particular, to a bidirectional transfer device, an RGV, and a liquid injection apparatus.

BACKGROUND

RGV (Rail Guided Vehicle) is a common transfer tool in liquid injection and formation apparatus, and the RGV can transfer a liquid injection jig from a liquid injection device to a standing device, and after standing, the RGV transfers the liquid injection jig to a discharging station. At present, most common RGVs have a single-sided transfer structure, that is, the liquid injection jig can only be transferred on the same side of the RGV, which affects the transportation efficiency of the RGV, and limits the spatial distribution of the liquid injection and formation apparatus. In order to improve the transportation efficiency and space utilization, some manufacturers have designed RGVs with bidirectional transfer capabilities. However, the designed RGVs have limited transport range, so it is necessary to configure multiple RGVs for transfer. Additionally, the liquid injection jig needs manpower or mechanical arms to help transfer up and down on both sides of the RGV, which increases the production cost.

SUMMARY

In order to solve at least one of the above-mentioned technical problems, the disclosure provides a bidirectional transfer device, an RGV and a liquid injection apparatus, and the adopted technical solution is as follows.

The liquid injection apparatus provided by the disclosure comprises an RGV and an RGV transport rail, wherein the RGV is movable along the RGV transport rail.

The RGV provided by the disclosure comprises a bidirectional transfer device and a transfer lifting device, and the bidirectional transfer base is connected to the transfer lifting device.

The bidirectional transfer device provided by the disclosure comprises a bidirectional transfer base, a bidirectional transfer arm assembly, a bidirectional transfer driving assembly, a bidirectional transfer auxiliary assembly, a bidirectional transfer auxiliary driving assembly, a transfer auxiliary fixing assembly and a first transfer positioning sensor, wherein the bidirectional transfer arm assembly is movably disposed on the bidirectional transfer base, the bidirectional transfer driving assembly is respectively connected to the bidirectional transfer base and the bidirectional transfer arm assembly, the bidirectional transfer driving assembly is configured for driving the bidirectional transfer arm assembly to move along a first direction and the bidirectional transfer driving assembly is configured for driving the bidirectional transfer arm assembly to move along a second direction, and the first direction and the second direction are opposite to each other; the bidirectional transfer auxiliary assembly is connected to the bidirectional transfer arm assembly, the bidirectional transfer auxiliary assembly is movable relative to the bidirectional transfer arm assembly, the bidirectional transfer auxiliary assembly comprises a bidirectional auxiliary push-pull component, a bidirectional transfer auxiliary mounting plate and an auxiliary lifting driver, the auxiliary lifting driver is connected to the bidirectional transfer auxiliary mounting plate, the bidirectional auxiliary push-pull component is connected to an output end of the auxiliary lifting driver; along the first direction, two ends of the bidirectional auxiliary push-pull component are respectively provided with an auxiliary push-pull connecting component, and the auxiliary push-pull connecting component is configured for connecting a liquid injection jig; the bidirectional transfer auxiliary driving assembly is respectively connected to the bidirectional transfer auxiliary assembly and the bidirectional transfer arm assembly, the bidirectional transfer auxiliary driving assembly is configured for driving the bidirectional transfer auxiliary assembly to move relative to the bidirectional transfer arm assembly along the first direction and the bidirectional transfer auxiliary driving assembly is configured for driving the bidirectional transfer auxiliary assembly to move relative to the bidirectional transfer arm assembly along the second direction; the transfer auxiliary fixing assembly is connected to the bidirectional transfer base, and the transfer auxiliary fixing assembly is configured for fixing the liquid injection jig; and the first transfer positioning sensor is connected to the bidirectional transfer base, and the first transfer positioning sensor is configured for detecting a moving position of the liquid injection jig on the bidirectional transfer device.

In some embodiments of the disclosure, the bidirectional transfer driving assembly comprises a bidirectional transfer driver, a first transfer transmission gear and a first transfer transmission rack, the first transfer transmission rack is connected to the bidirectional transfer arm assembly, the first transfer transmission gear is connected to an output end of the bidirectional transfer driver, and the bidirectional transfer driver is connected to the bidirectional transfer base.

In some embodiments of the disclosure, two bidirectional transfer arm assemblies are provided, the two bidirectional transfer arm assemblies are arranged side by side, and the bidirectional transfer auxiliary assembly is provided between the two bidirectional transfer arm assemblies; and the bidirectional transfer device comprises an arm connecting rod, and two ends of the arm connecting rod are respectively connected to the two bidirectional transfer arm assemblies.

In some embodiments of the disclosure, the bidirectional transfer arm assembly comprises a bidirectional transfer guide component, the bidirectional transfer guide component is connected to the bidirectional transfer arm assembly, and the bidirectional transfer guide component is slidably connected to the bidirectional transfer base; the bidirectional transfer device comprises an arm supporting-rolling component, and the arm supporting-rolling component is arranged on the bidirectional transfer base; and the arm supporting-rolling component supports the bidirectional transfer guide component and the arm supporting-rolling component is in rolling contact with the bidirectional transfer guide component, or the arm supporting-rolling component supports the bidirectional transfer arm assembly and the arm supporting-rolling component is in rolling contact with the bidirectional transfer arm assembly.

In some embodiments of the disclosure, the bidirectional transfer arm assembly comprises an arm component and a transfer rolling component, the transfer rolling component is in rolling connection with the arm component, and the transfer rolling component is configured for rolling and supporting the liquid injection jig.

In some embodiments of the disclosure, the bidirectional transfer auxiliary driving assembly comprises a bidirectional transfer auxiliary driver, a second transfer transmission gear and a second transfer transmission rack; the bidirectional transfer auxiliary driver is connected to the bidirectional transfer auxiliary mounting plate, the second transfer transmission gear is connected to an output end of the bidirectional transfer auxiliary driver, and the second transfer transmission rack is connected to the bidirectional transfer arm assembly.

In some embodiments of the disclosure, two ends of the bidirectional auxiliary push-pull component are respectively provided with at least two auxiliary push-pull connecting components, and the auxiliary push-pull connecting component protrudes from an upper side of the bidirectional auxiliary push-pull component.

In some embodiments of the disclosure, the transfer auxiliary fixing assembly comprises two transfer auxiliary fixators, and the two transfer auxiliary fixators are arranged opposite to each other on the bidirectional transfer base.

The embodiments of the disclosure at least have the following beneficial effects. The bidirectional transfer auxiliary assembly moves relative to the bidirectional transfer arm assembly along the first direction, and the auxiliary push-pull connecting component is connected to the liquid injection jig. The bidirectional transfer auxiliary assembly moves relative to the bidirectional transfer arm assembly along the second direction to drag the liquid injection jig to the bidirectional transfer arm assembly. The bidirectional transfer arm assembly moves along the second direction, and the liquid injection jig moves along with the bidirectional transfer arm assembly. After the liquid injection jig triggers the first transfer positioning sensor, the bidirectional transfer arm assembly stops moving, the transfer auxiliary fixing assembly fixes the liquid injection jig, and the bidirectional transfer auxiliary assembly is separated from the liquid injection jig. The bidirectional transfer auxiliary assembly moves relative to the bidirectional transfer arm assembly along the first direction to a bottom portion of the liquid injection jig, the bidirectional transfer auxiliary assembly is connected to the liquid injection jig, and the bidirectional transfer auxiliary assembly moves relative to the bidirectional transfer arm assembly along the second direction to push the liquid injection jig to move along the second direction. The liquid injection jig triggers the first transfer positioning sensor, the bidirectional transfer auxiliary assembly is separated from the liquid injection jig. The bidirectional transfer auxiliary assembly moves relative to the bidirectional transfer arm assembly to reach a rear side of the liquid injection jig, the bidirectional transfer auxiliary assembly is connected to the liquid injection jig, and the bidirectional transfer arm assembly moves along the second direction. After the bidirectional transfer arm assembly protrudes, the bidirectional transfer auxiliary assembly moves relative to the bidirectional transfer arm assembly along the second direction to push the liquid injection jig out from the bidirectional transfer arm assembly. Therefore, the bidirectional transfer device moves the liquid injection jig from one side of the bidirectional transfer device to the other side. The disclosure can be widely applied to the technical field of lithium battery production apparatuses.

BRIEF DESCRIPTION OF THE DRAWINGS

The above and/or additional aspects and advantages of the disclosure will be more apparent and readily appreciated from the following description of the embodiments in conjunction with the drawings.

REFERENCE NUMERALS

Figure 1:
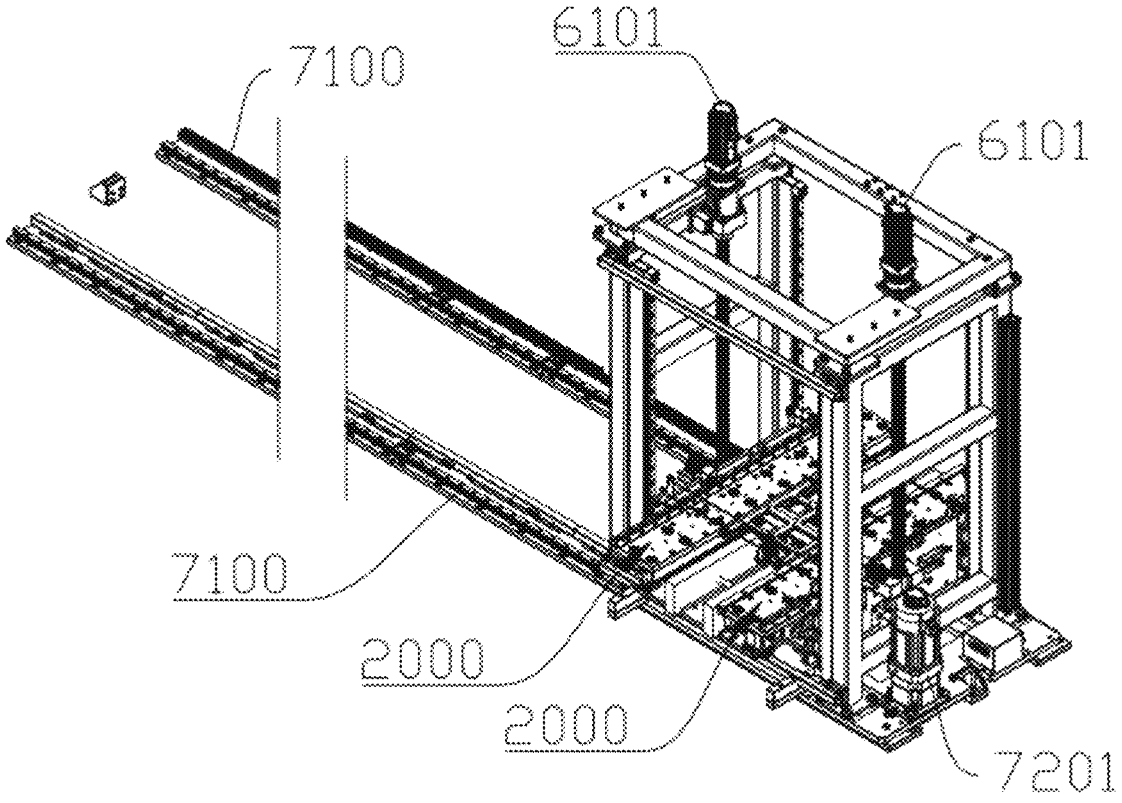
FIG. 1 is a structural diagram of an RGV arranged on an RGV transport rail.
Figure 2:
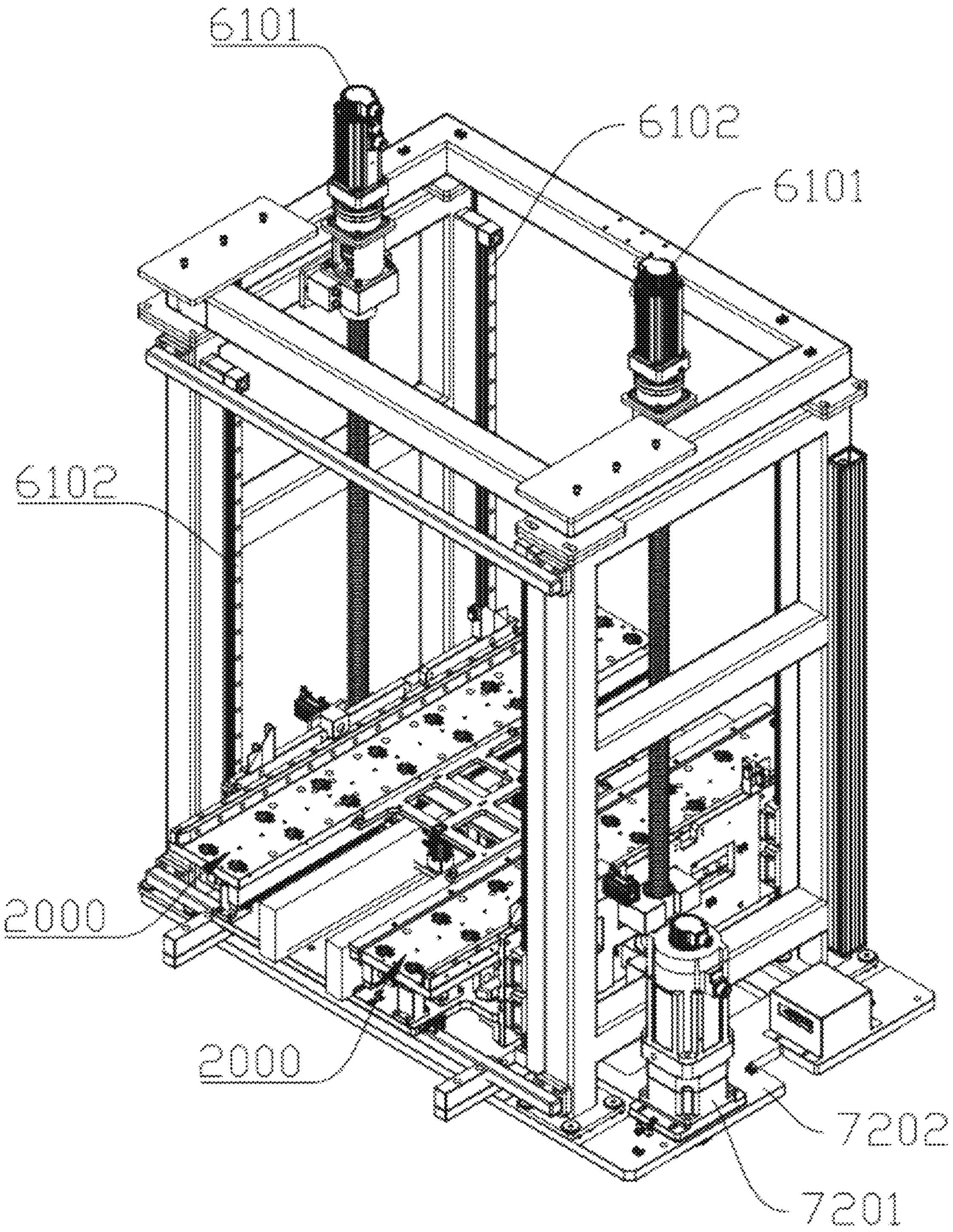
FIG. 2 is a structural diagram of the RGV showing an RGV transport driver and an RGV transport mounting plate.
Figure 3:
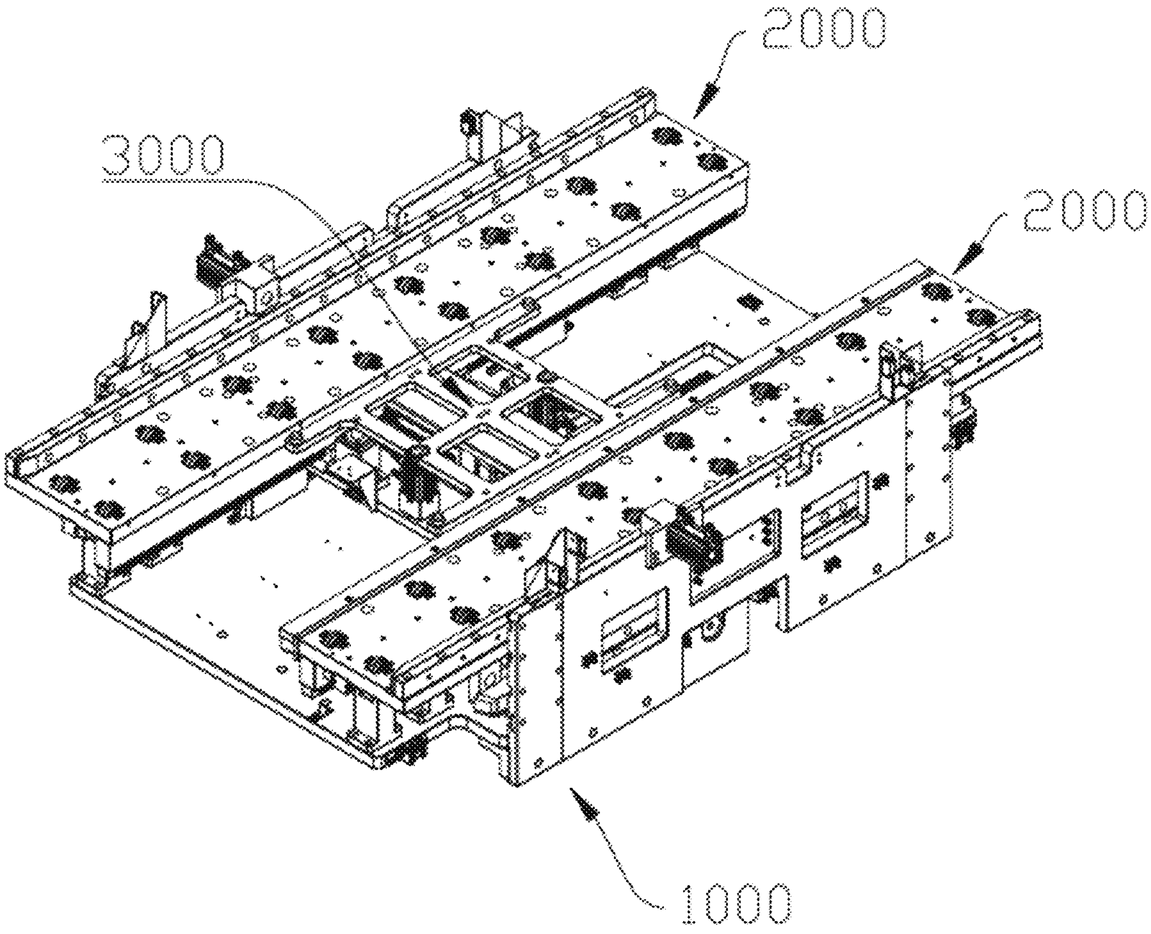
FIG. 3 is a structural diagram of a bidirectional transfer device.
Figure 4:
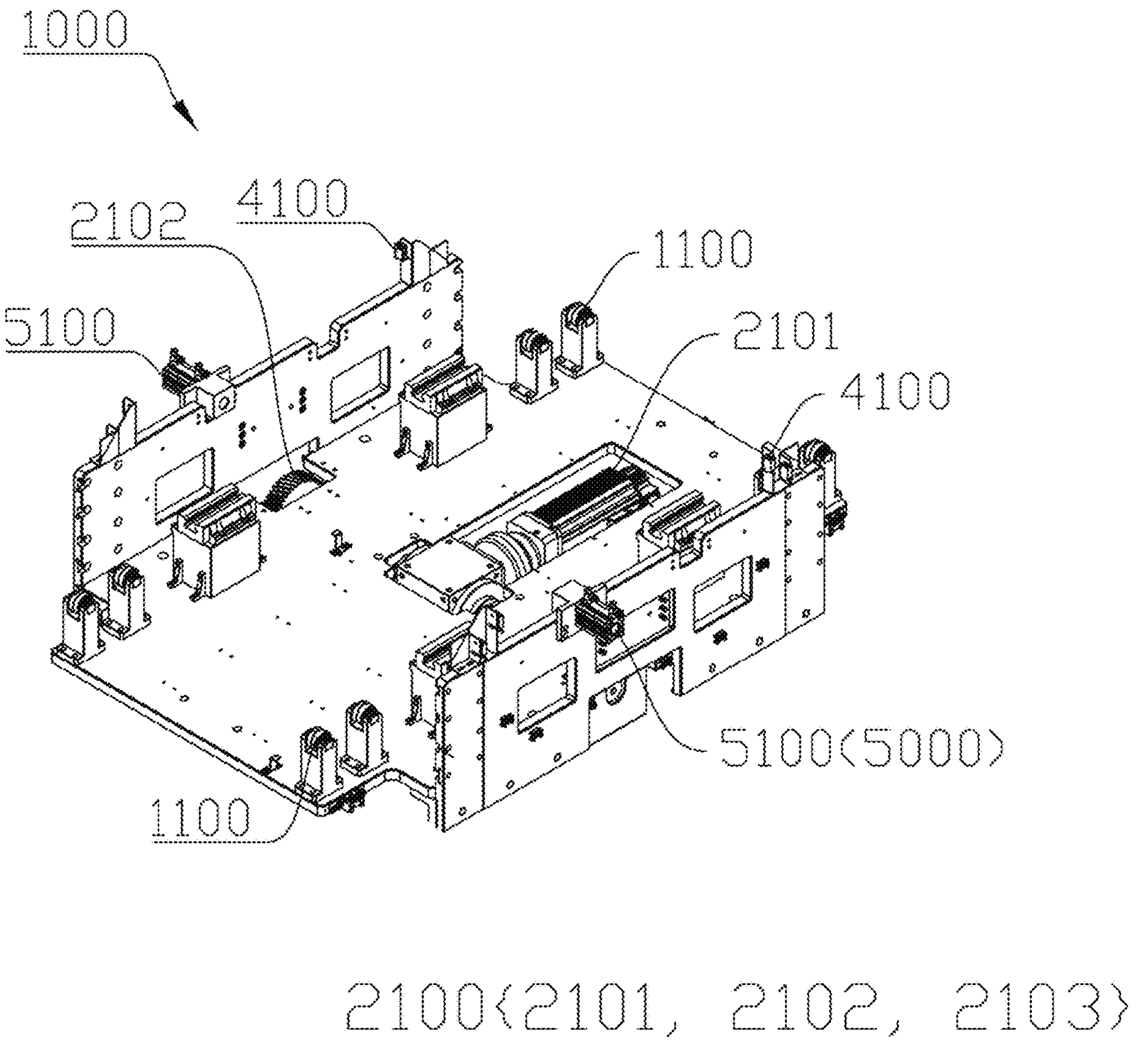
FIG. 4 is a structural diagram of a bidirectional transfer base.
Figure 5:
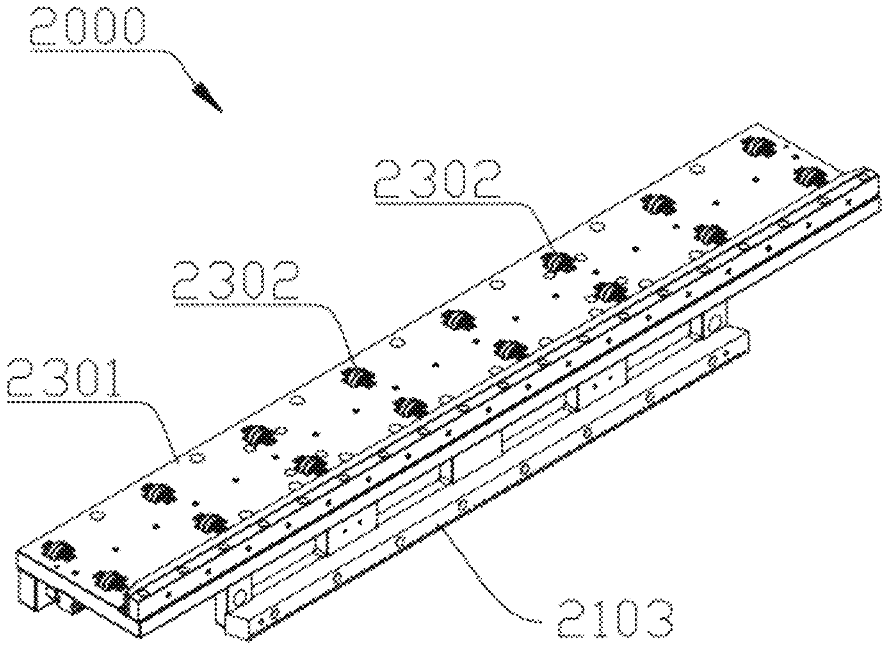
FIG. 5 is a structural diagram of a bidirectional transfer arm assembly.
Figure 6:
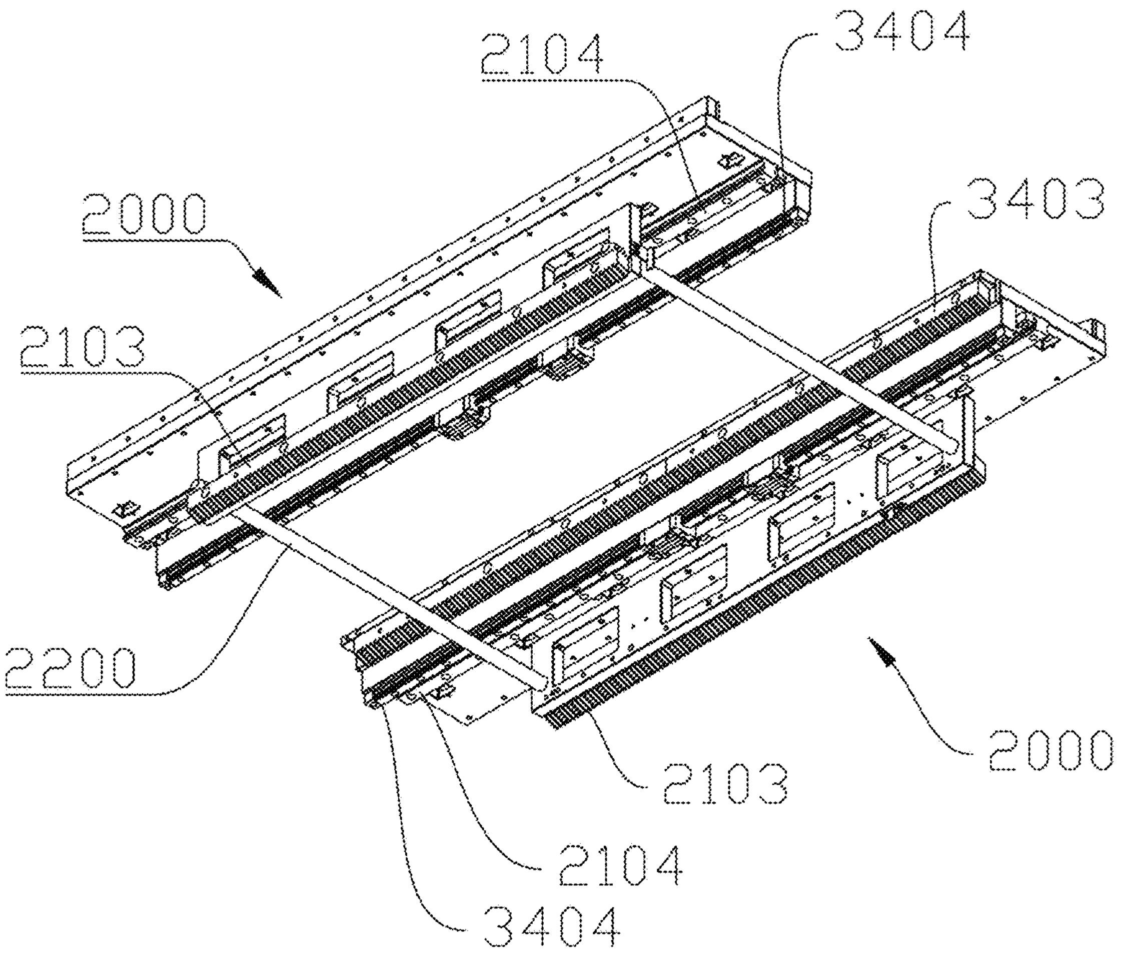
FIG. 6 is a structural diagram of the assembly of two bidirectional transfer arm assemblies.
Figure 7:
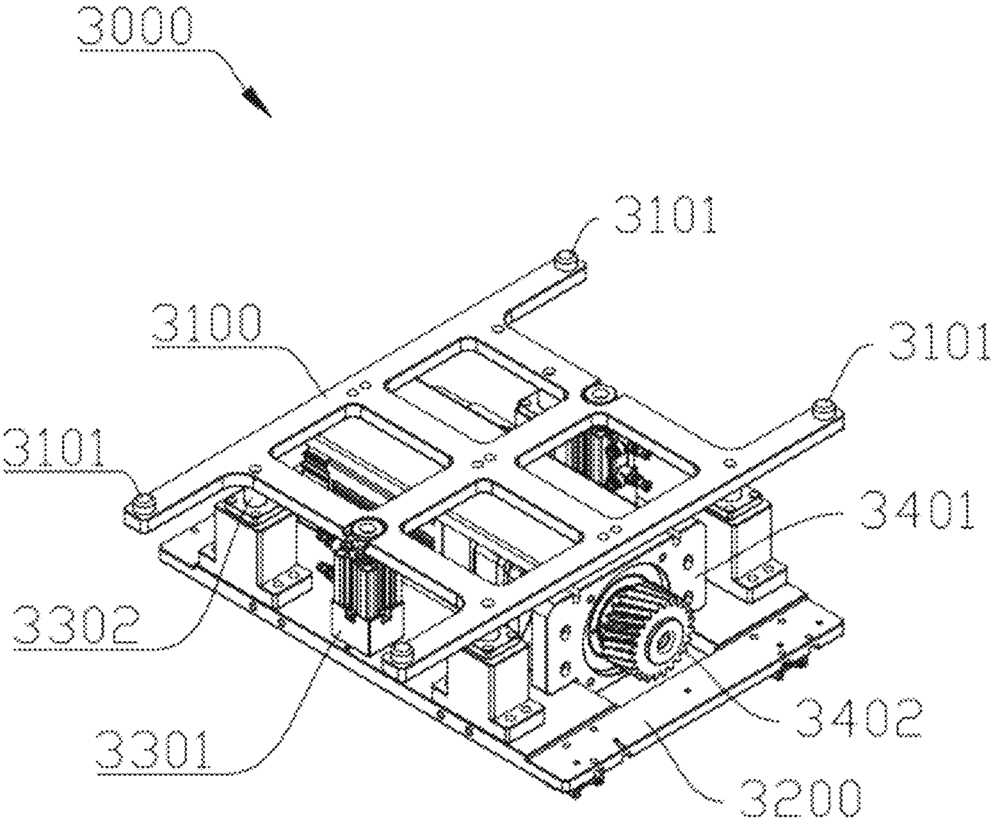
FIG. 7 is a structural diagram of a bidirectional transfer auxiliary assembly.

- 1000—bidirectional transfer base; and 1100—arm supporting-rolling component;
- 2000—bidirectional transfer arm assembly;
- 2100—bidirectional transfer driving assembly; 2101—bidirectional transfer driver; 2102—first transfer transmission gear; 2103—first transfer transmission rack; and 2104—bidirectional transfer guide component;
- 2200—arm connecting rod;
- 2301—arm component; and 2302—transfer rolling component;
- 3000—bidirectional transfer auxiliary assembly;
- 3100—bidirectional auxiliary push-pull component; and 3101—auxiliary push-pull connecting component;
- 3200—bidirectional transfer auxiliary mounting plate;
- 3301—auxiliary lifting driver; and 3302—auxiliary lifting guide component;
- 3401—bidirectional transfer auxiliary driver; 3402—second transfer transmission gear; 3403—second transfer transmission rack; and 3404—bidirectional transfer auxiliary guide component;
- 4100—first transfer positioning sensor;
- 5000—transfer auxiliary fixing assembly; 5100—transfer auxiliary fixator;
- 6101—transfer lifting driver; and 6102—transfer lifting guide component;
- 7100—RGV transport rail; and
- 7201—RGV transport driver; and 7202—RGV transport mounting plate.

DETAILED DESCRIPTION

The embodiments of the disclosure will be described in detail hereinafter with reference to FIG. 1 to FIG. 8. Examples of the embodiments are shown in the drawings. The same or similar reference numerals throughout the drawings denote the same or similar elements or elements having the same or similar functions. The embodiments described below by reference to the drawings are exemplary and are intended only to explain the disclosure and are not to be construed as limiting the disclosure.

In the description of the disclosure, it should be understood that if described, the orientation or positional relationship indicated by the terms "center", "middle", "longitudinal", "transversal", "length", "width", "thickness", "upper", "lower", "front", "rear", "left", "right", "vertical", "horizontal", "top", "bottom", "inner", "outer", "axial", "radial", "circumferential" and the like is based on the orientation or positional relationship shown in the drawings, or the orientation or positional relationship that the product of the disclosure is commonly placed in use, or the direction or positional relationship commonly understood by those of ordinary skills in the art, it is only for the convenience of describing the disclosure and simplifying the description, and it is not to indicate or imply that the indicated device or element must have a specific orientation, be constructed and operate in a specific orientation. Therefore, the terms should not be construed as limiting the disclosure. In addition, the features defined with "first" and "second" may explicitly or implicitly include one or more of the features. In the description of the disclosure, unless otherwise stated, "a plurality of" means two or more.

In the description of the disclosure, it should be noted that unless otherwise specified and limited, the terms "mounting", "connected", "connection", and the like should be understood broadly, for example, the connection may be fixed connection, and may also be detachable connection or integral connection; may be mechanical connection, and may also be electrical connection; and may be direct connection, may also be indirect connection through an intermediate medium, and may also be internal communication between two elements. The specific meaning of the above terms in the disclosure can be understood in a specific case by those of ordinary skills in the art.

The disclosure relates to an RGV. The RGV comprises a bidirectional transfer device, wherein a liquid injection jig can be transferred on the bidirectional transfer device along a first direction, and the liquid injection jig can also be reversely transferred along a second direction. Further, the RGV comprises a transfer lifting device. The transfer lifting device is arranged in a frame of the RGV. The bidirectional transfer device is connected to the transfer lifting device. To be specific, a bidirectional transfer base 1000 in the bidirectional transfer device is connected to the transfer lifting device. Under the driving of the transfer lifting device, the bidirectional transfer device can ascend and descend, so that liquid injection jigs with different heights can be transferred, and the liquid injection jigs can also be transferred to different heights.

In an embodiment, the transfer lifting device comprises a transfer lifting driver 6101. The transfer lifting driver 6101 is connected to the frame of the RGV, the transfer lifting driver 6101 is located at a top portion of the frame of the RGV, and the transfer lifting driver 6101 is configured to drive the bidirectional transfer device to ascend and descend through a ball screw pair.

Specifically, the transfer lifting driver 6101 is implemented by a motor, two ends of a screw in the ball screw pair are respectively connected to the transfer lifting driver 6101 and the frame of the RGV, and a nut in the ball screw pair is connected to the bidirectional transfer base 1000.

In order to enable the bidirectional transfer device to ascend and descend stably, the transfer lifting device comprises a transfer lifting guide component 6102, and the bidirectional transfer base 1000 is slidably connected to the transfer lifting guide component 6102. In some examples, the transfer lifting guide component 6102 is implemented by a guide rail, and the bidirectional transfer base 1000 is connected to the transfer lifting guide component 6102 through a slider. In some examples, the transfer lifting guide component 6102 is implemented by a guide rod, and the bidirectional transfer base 1000 is connected to the transfer lifting guide component 6102 through a linear bearing.

In order to improve the lifting stability of the bidirectional transfer device, a plurality of transfer lifting devices are designed. With reference to the drawings, two transfer lifting devices are provided, and are respectively connected to opposite sides of the bidirectional transfer base 1000.

The disclosure relates to a liquid injection apparatus. The liquid injection apparatus comprises an RGV and an RGV transport rail 7100. The RGV is movable along the RGV transport rail 7100 to complete transport of a liquid injection jig in the liquid injection apparatus. It can be understood that the liquid injection apparatus comprises a standing device and a liquid injection device. The liquid injection device injects liquid into a liquid injection cup in the liquid injection jig, the liquid injection jig is transferred to the RGV, and the RGV transfers the liquid injection jig to the standing device. After standing, the liquid injection jig is transferred to the RGV, the RGV moves to a designated position along the RGV transport rail 7100, and the liquid injection jig is sent out from the RGV.

In some examples, the bidirectional transfer device on the RGV can transfer the liquid injection jig on one side of the RGV transport rail 7100 to the other side of the RGV transport rail 7100. In some examples, on the same side of the RGV transport rail 7100, the RGV can also transport the liquid injection jig from one end of the RGV transport rail 7100 to the other end through the bidirectional transfer device, or put the liquid injection jig down along the way of the RGV transport rail 7100.

It can be understood that the RGV comprises an RGV transport driving assembly. Driven by the RGV transport driving assembly, the RGV is movable along the RGV transport rail 7100.

In some examples, the RGV transport driving assembly comprises an RGV transport driver 7201, an RGV transport transmission gear and an RGV transport transmission rack. The RGV transport driver 7201 is connected to the frame of the RGV, the RGV transport transmission rack is connected to a base where the RGV transport rail 7100 is located, and the RGV transport transmission gear is connected to the RGV transport driver 7201. In some examples, the RGV transport driver 7201 comprises a motor.

With reference to the drawings, the RGV transport driving assembly comprises an RGV transport mounting plate 7202, the frame of the RGV is connected to the RGV transport mounting plate 7202, and the RGV transport driver 7201 is connected to the RGV transport mounting plate 7202.

As for the RGV transport driving assembly, as an alternative solution, in some examples, the RGV transport driving assembly drives the RGV to move along the RGV transport rail 7100 through a transmission belt, and further, the RGV transport driving assembly drives the RGV through a synchronous belt.

Supplementary explanation about the RGV: if the RGV is not equipped with a transfer lifting device, the bidirectional transfer device may also be used as the RGV when moving along the RGV transport rail 7100.

Other structures and operations of the RGV and the liquid injection apparatus have been recorded in related arts for those of ordinary skills in the art, and will not be described in detail here. The structure of the bidirectional transfer device will be introduced below.

The disclosure relates to a bidirectional transfer device, which can transfer a liquid injection jig along a first direction and also can transfer the liquid injection jig along a second direction, and the first direction and the second direction are reversed, thereby realizing the bidirectional transfer of the liquid injection jig.

With reference to the drawings, the bidirectional transfer device comprises a bidirectional transfer base 1000, a bidirectional transfer arm assembly 2000 and a bidirectional transfer auxiliary assembly 3000. The bidirectional transfer arm assembly 2000 is arranged on the bidirectional transfer base 1000, and the bidirectional transfer auxiliary assembly 3000 is connected to the bidirectional transfer arm assembly 2000. In order to realize the transfer of the liquid injection jig on the bidirectional transfer device, the bidirectional transfer arm assembly 2000 is designed to be movable on the bidirectional transfer base 1000, and the bidirectional transfer auxiliary assembly 3000 is movable relative to the bidirectional transfer arm assembly 2000.

Specifically, the bidirectional transfer auxiliary assembly 3000 moves relative to the bidirectional transfer arm assembly 2000 to pull the liquid injection jig from one end of the bidirectional transfer arm assembly 2000 to the bidirectional transfer arm assembly 2000. The bidirectional transfer arm assembly 2000 moves on the bidirectional transfer base 1000 to transfer the liquid injection jig, and the bidirectional transfer auxiliary assembly 3000 moves relative to the bidirectional transfer arm assembly 2000 to transfer the liquid injection jig out of the bidirectional transfer arm assembly 2000 from the other end of the bidirectional transfer arm assembly 2000.

The bidirectional transfer device comprises a bidirectional transfer driving assembly 2100. The bidirectional transfer driving assembly 2100 is respectively connected to the bidirectional transfer base 1000 and the bidirectional transfer arm assembly 2000, and the bidirectional transfer driving assembly 2100 is configured for driving the bidirectional transfer arm assembly 2000 to move on the bidirectional transfer base 1000. Specifically, the bidirectional transfer driving assembly 2100 is configured for driving the bidirectional transfer arm assembly 2000 to move along the first direction and the bidirectional transfer driving assembly 2100 is configured for driving the bidirectional transfer arm assembly 2000 to move along the second direction, thus realizing the bidirectional transfer of the liquid injection jig.

With reference to the drawings, the bidirectional transfer arm assembly 2000 comprises an arm component 2301. The arm component 2301 is configured for bearing the liquid injection jig. Under the driving of the bidirectional transfer driving assembly 2100, the arm component 2301 is movable, and the arm component 2301 can protrude from the bidirectional transfer base 1000. It can be understood that if a position where the liquid injection jig is located or a position where the liquid injection jig is to be put is far away from the bidirectional transfer base 1000, the bidirectional transfer driving assembly 2100 may drive the arm component 2301 to protrude, thereby expanding the transfer range.

It can be understood that in order to facilitate the bidirectional transfer auxiliary assembly 3000 to pull or push the liquid injection jig to move on the bidirectional transfer arm assembly 2000, the bidirectional transfer arm assembly 2000 is designed to comprise a transfer rolling component 2302. The transfer rolling component 2302 is in rolling connection with the arm component 2301. The transfer rolling component 2302 is configured for rolling and supporting the liquid injection jig. With reference to the drawings, a plurality of transfer rolling components 2302 are provided. In some examples, the transfer rolling component 2302 is provided with a roll ball or a roller wheel.

In an embodiment, the bidirectional transfer driving assembly 2100 comprises a bidirectional transfer driver 2101, a first transfer transmission gear 2102 and a first transfer transmission rack 2103. The bidirectional transfer driver 2101 is implemented by a motor, the bidirectional transfer driver 2101 is connected to the bidirectional transfer base 1000, the first transfer transmission gear 2102 is connected to an output end of the bidirectional transfer driver 2101, and the first transfer transmission gear 2102 is implemented by a helical gear. The first transfer transmission gear 2102 is engaged with the first transfer transmission rack 2103, and the first transfer transmission rack 2103 is connected to the bidirectional transfer arm assembly 2000. Specifically, the first transfer transmission rack 2103 is connected to a lower side of the arm component 2301.

As for the bidirectional transfer driving assembly 2100, as an alternative solution, the bidirectional transfer driving assembly 2100 may also be designed as follows. The bidirectional transfer driving assembly 2100 drives the bidirectional transfer arm assembly 2000 to move back and forth through a transmission belt, specifically, the arm component 2301 is connected to the transmission belt. Further, the transmission belt is implemented by a synchronous belt.

It can be understood that the bidirectional transfer arm assembly 2000 comprises a bidirectional transfer guide component 2104. The bidirectional transfer guide component 2104 is connected to the bidirectional transfer arm assembly 2000, and the bidirectional transfer guide component is slidably connected to the bidirectional transfer base 1000. With reference to the drawings, the bidirectional transfer guide component 2104 is implemented by a guide rail, the bidirectional transfer guide component 2104 is connected to a lower side of the arm component 2301, and the bidirectional transfer base 1000 is provided with a slider. Specifically, the slider is arranged on an upright post of the bidirectional transfer base 1000. On the one hand, the slider has the functions of limiting and guiding the bidirectional transfer arm assembly 2000; on the other hand, the slider and the upright post serve to support the bidirectional transfer arm assembly 2000.

As for the bidirectional transfer guide component 2104, as an alternative solution, the bidirectional transfer guide component may also be designed as follows. The bidirectional transfer guide component 2104 is implemented by a guide rod, the bidirectional transfer guide component 2104 is connected to the lower side of the arm component 2301, and the bidirectional transfer base 1000 is provided with a linear bearing connected to the guide rod.

Further, the bidirectional transfer device comprises an arm supporting-rolling component 1100. The arm supporting-rolling component 1100 is arranged on the bidirectional transfer base 1000. The arm supporting-rolling component 1100 is configured for supporting the bidirectional transfer arm assembly 2000 to improve the stability of the bidirectional transfer arm assembly 2000. With reference to the drawings, the bidirectional transfer base 1000 is provided with an upright post, the arm supporting-rolling component 1100 is arranged at a top portion of the upright post, the arm supporting-rolling component 1100 supports the bidirectional transfer guide component 2104, and the arm supporting-rolling component 1100 is in rolling contact with the bidirectional transfer guide component 2104. It can be understood that during the movement of the bidirectional transfer arm assembly 2000, the arm supporting-rolling component 1100 rolls against and supports a side surface of the bidirectional transfer guide component 2104. In some examples, the arm supporting-rolling component 1100 is provided as a roller wheel or a rolling bearing.

As for the arm supporting-rolling component 1100, as an alternative solution, the arm supporting-rolling component may also be designed as follows. The arm supporting-rolling component 1100 supports the bidirectional transfer arm assembly 2000, and the arm supporting-rolling component 1100 is in rolling contact with the bidirectional transfer arm assembly 2000. Specifically, the arm supporting-rolling component 1100 rolls against and supports the lower side of the arm component 2301.

With reference to the drawings, two bidirectional transfer arm assemblies 2000 are provided, the two bidirectional transfer arm assemblies 2000 are arranged side by side, a bottom portion of the liquid injection jig is placed across the two bidirectional transfer arm assemblies, and the bidirectional transfer auxiliary assembly 3000 is provided between the two bidirectional transfer arm assemblies 2000. The space formed between the two bidirectional transfer arm assemblies 2000 can be used for the bidirectional transfer auxiliary assembly 3000 to move back and forth.

It can be understood that, driven by the bidirectional transfer driving assembly 2100, the two bidirectional transfer arm assemblies 2000 move synchronously. Specifically, the bidirectional transfer driver 2101 is provided with two output ends, and the two output ends are respectively provided with a first transfer transmission gear 2102.

Further, in order to make the two bidirectional transfer arm assemblies 2000 move synchronously, the bidirectional transfer device comprises an arm connecting rod 2200. Two ends of the arm connecting rod 2200 are respectively connected to the two bidirectional transfer arm assemblies 2000. Specifically, two ends of the arm connecting rod 2200 are respectively connected to the lower sides of the arm components 2301. With reference to the drawings, two arm connecting rods 2200 are provided.

As for the bidirectional transfer arm assembly 2000, as an alternative solution, the bidirectional transfer arm assembly may also be designed as follows. One bidirectional transfer arm assembly 2000 in the bidirectional transfer device is provided, the bidirectional transfer arm assembly 2000 is provided with two arm components 2301, and the two arm components 2301 are arranged on a large mounting frame in the bidirectional transfer arm assembly 2000.

The bidirectional transfer auxiliary assembly 3000 comprises a bidirectional auxiliary push-pull component 3100. Along the first direction, two ends of the bidirectional auxiliary push-pull component 3100 are respectively provided with an auxiliary push-pull connecting component 3101, and the auxiliary push-pull connecting component 3101 is configured for connecting the liquid injection jig. Specifically, the auxiliary push-pull connecting component 3101 protrudes from an upper side of the bidirectional auxiliary push-pull component 3100, and the auxiliary push-pull connecting component 3101 is connected to a bottom portion of the liquid injection jig.

Further, in order to make the bidirectional auxiliary push-pull component 3100 smoothly pull or push the liquid injection jig, at least two auxiliary push-pull connecting components 3101 are respectively arranged at both ends of the bidirectional auxiliary push-pull component 3100. With reference to the drawings, two bidirectional auxiliary push-pull arms are arranged at the end portion of the bidirectional auxiliary push-pull component 3100, one end of the bidirectional auxiliary push-pull arm is connected to the bidirectional auxiliary push-pull component 3100, and the other end of the bidirectional auxiliary push-pull arm is provided with an auxiliary push-pull connecting component 3101.

It can be understood that a lower side of a bottom plate of the liquid injection jig is provided with jig push-pull connection recesses corresponding to the auxiliary push-pull connecting components 3101. Specifically, the bottom plate of the liquid injection jig is provided with two sets of jig push-pull connection recesses corresponding to the auxiliary push-pull connecting components 3101 at both ends of the bidirectional auxiliary push-pull component 3100. In some examples, the bottom plate of the injection jig may also be designed to have one set of jig push-pull connection recesses, and the auxiliary push-pull connecting components at both ends of the bidirectional auxiliary push-pull component 3100 are respectively connected to the set of jig push-pull connection recesses to realize pulling or pushing.

In order to facilitate smooth connection and disconnection of the auxiliary push-pull connecting component 3101 with the bottom portion of the liquid injection jig, the bidirectional auxiliary push-pull component 3100 is designed to be able to ascend and descend. Specifically, the bidirectional transfer auxiliary assembly 3000 comprises a bidirectional transfer auxiliary mounting plate 3200 and an auxiliary lifting driver 3301. The auxiliary lifting driver 3301 is connected to the bidirectional transfer auxiliary mounting plate 3200, and the bidirectional auxiliary push-pull component 3100 is connected to an output end of the auxiliary lifting driver 3301. In some examples, the auxiliary lifting driver 3301 is implemented by an air cylinder.

Further, a plurality of auxiliary lifting drivers 3301 are provided, so that the bidirectional auxiliary push-pull component 3100 can ascend and descend smoothly. With reference to the drawings, two auxiliary lifting drivers 3301 are provided.

It can be understood that when the bidirectional auxiliary push-pull component 3100 moves to be in place, if the auxiliary push-pull connecting component 3101 needs to be separated from the bottom portion of the liquid injection jig, the auxiliary lifting driver 3301 drives the bidirectional auxiliary push-pull component 3100 to descend. If the auxiliary push-pull connecting component needs to be connected to the bottom portion of the liquid injection jig, the auxiliary lifting driver 3301 drives the bidirectional auxiliary push-pull component 3100 to ascend.

In order to make the bidirectional auxiliary push-pull component 3100 ascend and descend smoothly, the bidirectional transfer auxiliary assembly 3000 comprises an auxiliary lifting guide component 3302. The auxiliary lifting guide component 3302 is respectively connected to the bidirectional transfer auxiliary mounting plate 3200 and the bidirectional auxiliary push-pull component 3100. With reference to the drawings, the auxiliary lifting guide component 3302 is implemented by a guide rod, an upper end of the auxiliary lifting guide component 3302 is fixedly connected to the bidirectional auxiliary push-pull component 3100, and the bidirectional transfer auxiliary mounting plate is provided with a linear bearing slidably connected to the auxiliary lifting guide component 3302. Further, a plurality of auxiliary lifting guide components 3302 are provided, so that the bidirectional auxiliary push-pull component 3100 can ascend and descend smoothly.

The bidirectional transfer device comprises a bidirectional transfer auxiliary driving assembly. The bidirectional transfer auxiliary driving assembly is respectively connected to the bidirectional transfer auxiliary assembly 3000 and the bidirectional transfer arm assembly 2000. The bidirectional transfer auxiliary driving assembly is configured for driving the bidirectional transfer auxiliary assembly 3000 to move relative to the bidirectional transfer arm assembly 2000. Specifically, the bidirectional transfer auxiliary driving assembly is configured for driving the bidirectional transfer auxiliary assembly 3000 to move relative to the bidirectional transfer arm assembly 2000 along the first direction, and the bidirectional transfer auxiliary driving assembly is configured for driving the bidirectional transfer auxiliary assembly 3000 to move relative to the bidirectional transfer arm assembly 2000 along the second direction.

It can be understood that when the bidirectional auxiliary push-pull component 3100 in the bidirectional transfer auxiliary assembly 3000 pulls the liquid injection jig onto the bidirectional transfer arm assembly 2000, and the bidirectional auxiliary push-pull component 3100 pushes the liquid injection jig out of the bidirectional transfer arm assembly 2000, it is necessary to change a position of the bidirectional transfer auxiliary assembly 3000 relative to the injection jig and switch the auxiliary push-pull connecting component 3101 of the bidirectional auxiliary push-pull component 3100 for connecting the liquid injection jig to realize handover of the bidirectional auxiliary push-pull component 3100. Therefore, it is necessary to design a bidirectional transfer auxiliary driving assembly. On one hand, the bidirectional transfer auxiliary driving assembly can change the position of the bidirectional transfer auxiliary assembly 3000 relative to the liquid injection jig, and on the other hand, the bidirectional transfer auxiliary driving assembly can drive the bidirectional transfer auxiliary assembly 3000 to pull or push the liquid injection jig.

In an embodiment, the bidirectional transfer auxiliary driving assembly comprises a bidirectional transfer auxiliary driver 3401, a second transfer transmission gear 3402 and a second transfer transmission rack 3403. The bidirectional transfer auxiliary driver 3401 is implemented by a motor. The bidirectional transfer auxiliary driver 3401 is connected to the bidirectional transfer auxiliary mounting plate 3200, the second transfer transmission gear 3402 is connected to an output end of the bidirectional transfer auxiliary driver 3401, the second transfer transmission gear 3402 is implemented by a helical gear, and the second transfer transmission rack 3403 is connected to the bidirectional transfer arm assembly 2000. Specifically, the second transfer transmission rack 3403 is connected to the arm component 2301.

It can be understood that under the driving of the bidirectional transfer auxiliary driver 3401, the second transfer transmission gear 3402 meshes with the second transfer transmission rack 3403 to drive the bidirectional transfer auxiliary assembly 3000 to move relative to the bidirectional transfer arm assembly 2000. When the bidirectional transfer auxiliary driver 3401 stops, the gear meshed between the second transfer transmission gear 3402 and the second transfer transmission rack 3403 can play a fixing role, and the bidirectional auxiliary push-pull component 3100 serves to fix and position the liquid injection jig to a certain extent, so that the bidirectional transfer arm assembly 2000 can prevent the liquid injection jig from displacing during the movement of the bidirectional transfer arm assembly 2000.

Further, in order to make the bidirectional transfer auxiliary assembly 3000 move smoothly, the bidirectional transfer arm assembly 2000 is provided with a bidirectional transfer auxiliary guide component 3404, and the bidirectional transfer auxiliary mounting plate 3200 is slidably connected to the bidirectional transfer auxiliary guide component 3404. Specifically, the bidirectional transfer auxiliary guide component 3404 is connected to the arm component 2301, the bidirectional transfer auxiliary guide component 3404 is implemented by a guide rail, and the bidirectional transfer auxiliary mounting plate 3200 is connected to the bidirectional transfer auxiliary guide component 3404 through a slider. Of course, as an alternative solution, the bidirectional transfer auxiliary guide component may also be designed as follows. The bidirectional transfer auxiliary guide component 3404 is implemented by a guide rod, and the bidirectional transfer auxiliary mounting plate 3200 is provided with a linear bearing.

When two bidirectional transfer arm assemblies 2000 are provided, in some examples, one of the bidirectional transfer arm assemblies 2000 is provided with a second transfer transmission rack 3403, and the two bidirectional transfer arm assemblies 2000 are respectively provided with a bidirectional transfer auxiliary guide component 3404. In some examples, two bidirectional transfer arm assemblies 2000 are respectively provided with a second transfer transmission rack 3403, the bidirectional transfer auxiliary driver 3401 has two output ends, and the two bidirectional transfer arm assemblies 2000 are respectively provided with a bidirectional transfer auxiliary guide component 3404.

As for the bidirectional transfer auxiliary driving assembly, as an alternative solution, the bidirectional transfer auxiliary driving assembly may also be designed as follows. The bidirectional transfer auxiliary driving assembly drives the bidirectional transfer auxiliary assembly 3000 to move back and forth through a transmission belt, and further, the transmission belt is implemented by a synchronous belt.

The bidirectional transfer device comprises a transfer auxiliary fixing assembly 5000. The transfer auxiliary fixing assembly 5000 is connected to the bidirectional transfer base 1000. When the position of the bidirectional transfer auxiliary assembly 3000 relative to the liquid injection jig needs to be changed, the transfer auxiliary fixing assembly 5000 is configured for fixing the liquid injection jig to prevent the liquid injection jig from displacing on the bidirectional transfer arm assembly 2000.

Specifically, the transfer auxiliary fixing assembly 5000 comprises a transfer auxiliary fixator 5100. The transfer auxiliary fixator 5100 is implemented by an air cylinder, and a push rod of the transfer auxiliary fixator 5100 can be pushed out to abut against a side surface of the liquid injection jig. With reference to the drawings, two transfer auxiliary fixators 5100 are provided. On the bidirectional transfer base 1000, the two transfer auxiliary fixators 5100 are oppositely arranged so as to clamp and fix the liquid injection jig. Specifically, the two transfer auxiliary fixators 5100 are respectively arranged on opposite sides of the bidirectional transfer base 1000, and the liquid injection jig passes between the two transfer auxiliary fixators 5100.

Of course, as for the transfer auxiliary fixing assembly 5000, it can be understood that: in some examples, a plurality of transfer auxiliary fixing assemblies are provided, and are arranged on the bidirectional transfer base 1000 at an interval along the transfer direction, so as to fix the position of the liquid injection jig more firmly.

The bidirectional transfer device comprises a first transfer positioning sensor 4100. The first transfer positioning sensor 4100 is connected to the bidirectional transfer base 1000 and configured for detecting a moving position of the liquid injection jig on the bidirectional transfer device. Specifically, the first transfer positioning sensor 4100 is implemented by an opposed photoelectric sensor or an opposed grating.

In some examples, two first transfer positioning sensors 4100 are provided. Along the transfer direction, the two first transfer positioning sensors 4100 are arranged at an interval on the bidirectional transfer base 1000. It can be understood that the position of the liquid injection jig is detected by using the two first transfer positioning sensors 4100, which is convenient to change the position of the bidirectional transfer auxiliary assembly 3000 relative to the liquid injection jig to realize handover of the bidirectional auxiliary push-pull component 3100.

In some examples, the bidirectional transfer device comprises a second transfer positioning sensor. The second transfer positioning sensor is implemented by an opposed photoelectric sensor or an opposed grating. The second transfer positioning sensor is configured for detecting a moving position of the bidirectional transfer arm assembly 2000. Specifically, if the second transfer positioning sensor is triggered during the outward protruding of the bidirectional transfer arm assembly 2000, it means that the bidirectional transfer arm assembly 2000 is protruded in place.

In some examples, the bidirectional transfer device comprises a third transfer positioning sensor. The third transfer positioning sensor is implemented by an opposed photoelectric sensor or an opposed grating. The third transfer positioning sensor is configured for monitoring a moving position of the bidirectional transfer auxiliary assembly 3000. Specifically, when the bidirectional transfer arm assembly 2000 is protruded in place, the bidirectional auxiliary push-pull component 3100 moves to the protruded position relative to the bidirectional transfer arm assembly 2000 in order to pull or push out the liquid injection jig. If the third transfer positioning sensor is triggered, it means that the bidirectional auxiliary push-pull component 3100 is protruded in place.

In the following, the process of conveying the liquid injection jig by the bidirectional transfer device in the disclosure is described in detail with a specific embodiment. It should be noted that the following description is only an example, and is not a specific limitation of the disclosure.

Figure 8:
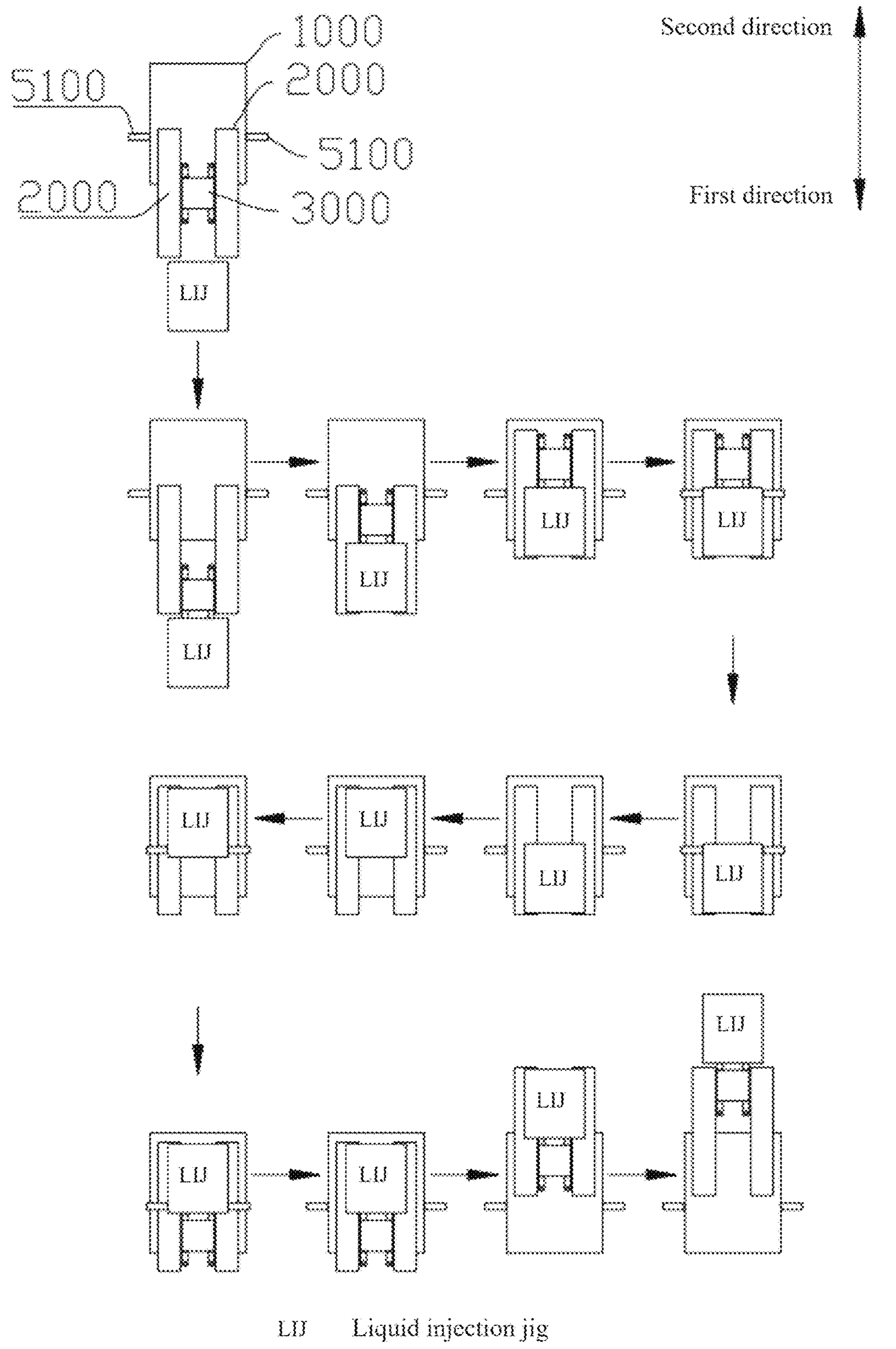
FIG. 8 is a schematic flowchart of the bidirectional transfer device for transferring a liquid injection jig.

With reference to FIG. 8, the operation flow of the bidirectional transfer method is as follows.

A liquid injection jig to be transferred is located at one side of the bidirectional transfer device. If the liquid injection jig to be transferred is far away from the bidirectional transfer device, the bidirectional transfer arm assembly 2000 protrudes along the first direction.

After the bidirectional transfer arm assembly 2000 protrudes in place, the bidirectional transfer auxiliary assembly 3000 moves along the first direction, and the bidirectional transfer auxiliary assembly 3000 protrudes relative to the bidirectional transfer arm assembly 2000, so that the auxiliary push-pull connecting component 3101 at a first end of the bidirectional auxiliary push-pull component 3100 is connected to the liquid injection jig. It can be understood that before or during the movement of the bidirectional transfer auxiliary assembly 3000 along the first direction, the bidirectional auxiliary push-pull component 3100 is in a descended position, and after the bidirectional transfer auxiliary assembly 3000 protrudes in place, the bidirectional auxiliary push-pull component 3100 ascends, so that the auxiliary push-pull connecting component 3101 can be connected to the lower side of the liquid injection jig.

After the auxiliary push-pull connecting component 3101 is connected to the liquid injection jig, the bidirectional transfer auxiliary assembly 3000 moves along the second direction to pull the liquid injection jig onto the bidirectional transfer arm assembly 2000.

The bidirectional transfer arm assembly 2000 moves along the second direction to transfer the liquid injection jig along the second direction. It can be understood that in this process, the bidirectional transfer auxiliary assembly 3000 is stationary relative to the bidirectional transfer arm assembly 2000, and the auxiliary push-pull connecting component 3101 keeps connected to the liquid injection jig, which facilitates to fix the position of the liquid injection jig.

While the bidirectional transfer arm assembly 2000 transfers the liquid injection jig along the second direction, the first transfer positioning sensor 4100 monitors a moving distance of the liquid injection jig, and if the moving distance of the liquid injection jig reaches a first set distance, the transfer auxiliary fixing assembly 5000 clamps and fixes the liquid injection jig.

The bidirectional auxiliary push-pull component 3100 descends, the bidirectional transfer auxiliary assembly 3000 moves along the first direction to reach below the liquid injection jig, the bidirectional auxiliary push-pull component 3100 ascends, and the auxiliary push-pull connecting component 3101 of the bidirectional auxiliary push-pull component 3100 is connected to the liquid injection jig.

The transfer auxiliary fixing assembly 5000 releases the fixing of the liquid injection jig, and the bidirectional transfer auxiliary assembly 3000 moves along the second direction to push the liquid injection jig to move on the bidirectional transfer arm assembly 2000. The first transfer positioning sensor 4100 monitors the moving distance of the liquid injection jig, and if the moving distance of the liquid injection jig reaches a second set distance, the transfer auxiliary fixing assembly 5000 clamps and fixes the liquid injection jig.

The bidirectional auxiliary push-pull component 3100 descends, the bidirectional transfer auxiliary assembly 3000 moves along the first direction, and the bidirectional auxiliary push-pull component 3100 ascends, so that the auxiliary push-pull connecting component 3101 at a second end of the bidirectional auxiliary push-pull component 3100 is connected to the liquid injection jig.

The transfer auxiliary fixing assembly 5000 releases the fixing of the liquid injection jig, and the bidirectional transfer arm assembly 2000 moves along the second direction to transfer the liquid injection jig along the second direction.

After the bidirectional transfer arm assembly 2000 protrudes in place, the bidirectional transfer arm assembly 2000 stops moving, and the bidirectional transfer auxiliary assembly 3000 moves along the second direction to push the liquid injection jig out of the bidirectional transfer arm assembly 2000.

It should be noted that two first transfer positioning sensors 4100 are used to obtain the first set distance and the second set distance. Specifically, the liquid injection jig moves by the first set distance to trigger the first transfer positioning sensor 4100, and the liquid injection jig continues to move by the second set distance to trigger the other first transfer positioning sensor 4100.

In some examples, if the RGV is moved by means of the RGV transport rail 7100, the liquid injection jig is transferred from one end to the other on the same side of the RGV transport rail 7100. In this case, after the bidirectional transfer auxiliary assembly 3000 pulls the liquid injection jig on one side of the RGV to the bidirectional transfer arm assembly 2000, the RGV moves in place, and the bidirectional transfer auxiliary assembly 3000 pushes the liquid injection jig out to the same side of the RGV.

In the description of this specification, the descriptions with reference to the terms "an embodiment", "some examples", "some embodiments", "illustrative embodiments", "examples", "specific examples" or "some illustrative examples" mean that the specific features, structures, materials or characteristics described in connection with this embodiment or example are included in at least one embodiment or example of the disclosure. In the specification, the schematic representation of the above terms does not necessarily mean the same embodiment or example. In addition, the described specific features, structures, or characters can be combined in any one or more embodiments in a suitable manner.

The embodiments of the disclosure are described in detail with reference to the drawings above, but the disclosure is not limited to the above embodiments, and various changes may also be made within the knowledge scope of those of ordinary skills in the art without departing from the purpose of the disclosure.

In the description of the disclosure, "," appearing in the title represents a relationship of "and" instead of "or". For example, a title "A and B" indicates the technical solution in which the designation of the subject matter is A and the technical solution of which the designation of the subject matter is B.

The invention claimed is:

1. A bidirectional transfer device, comprising:

a bidirectional transfer base;

a bidirectional transfer arm assembly, wherein the bidirectional transfer arm assembly is movably disposed on the bidirectional transfer base;

a bidirectional transfer driving assembly, wherein the bidirectional transfer driving assembly is respectively connected to the bidirectional transfer base and the bidirectional transfer arm assembly to drive the bidirectional transfer arm assembly to move along both a first direction and a second direction, and the first direction and the second direction are opposite to each other;

a bidirectional transfer auxiliary assembly, wherein the bidirectional transfer auxiliary assembly is connected to the bidirectional transfer arm assembly, the bidirectional transfer auxiliary assembly is movable relative to the bidirectional transfer arm assembly, the bidirectional transfer auxiliary assembly comprises a bidirectional auxiliary push-pull component, a bidirectional transfer auxiliary mounting plate and an auxiliary lifting driver, the auxiliary lifting driver is connected to the bidirectional transfer auxiliary mounting plate, the bidirectional auxiliary push-pull component is connected to an output end of the auxiliary lifting driver; and two ends of the bidirectional auxiliary push-pull component along the first direction are respectively provided with an auxiliary push-pull connecting component, and the auxiliary push-pull connecting component is connected to a liquid injection jig during operation;

a bidirectional transfer auxiliary driving assembly, wherein the bidirectional transfer auxiliary driving assembly is respectively connected to the bidirectional transfer auxiliary assembly and the bidirectional transfer arm assembly to drive the bidirectional transfer auxiliary assembly to move along the first direction relative to the bidirectional transfer arm assembly, and to drive the bidirectional transfer auxiliary assembly to move along the second direction relative to the bidirectional transfer arm assembly;

a transfer auxiliary fixing assembly, wherein the transfer auxiliary fixing assembly is connected to the bidirectional transfer base, and the transfer auxiliary fixing assembly fixes the liquid injection jig during operation; and a first transfer positioning sensor, wherein the first transfer positioning sensor is connected to the bidirectional transfer base;

wherein two bidirectional transfer arm assemblies are provided, the two bidirectional transfer arm assemblies are arranged side by side, and the bidirectional transfer auxiliary assembly is provided between the two bidirectional transfer arm assemblies; and the bidirectional transfer device comprises an arm connecting rod, and two ends of the arm connecting rod are respectively connected to the two bidirectional transfer arm assemblies; and wherein the bidirectional transfer arm assembly comprises a bidirectional transfer guide component, the bidirectional transfer guide component is connected to the bidirectional transfer arm assembly, and the bidirectional transfer guide component is slidably connected to the bidirectional transfer base; the bidirectional transfer device comprises an arm supporting-rolling component, and the arm supporting-rolling component is arranged on the bidirectional transfer base; the arm supporting-rolling component supports the bidirectional transfer guide component and the arm supporting-rolling component is in rolling contact with the bidirectional transfer guide component, or the arm supporting-rolling component supports the bidirectional transfer arm assembly and the arm supporting-rolling component is in rolling contact with the bidirectional transfer arm assembly.

2. The bidirectional transfer device according to claim 1, wherein the bidirectional transfer driving assembly comprises a bidirectional transfer driver, a first transfer transmission gear and a first transfer transmission rack, the first transfer transmission rack is connected to the bidirectional transfer arm assembly, the first transfer transmission gear is connected to an output end of the bidirectional transfer driver, and the bidirectional transfer driver is connected to the bidirectional transfer base.

3. The bidirectional transfer device according to claim 1, wherein the bidirectional transfer arm assembly comprises an arm component and a transfer rolling component, the transfer rolling component is in rolling connection with the arm component, and the transfer rolling component rolls and supports the liquid injection jig during operation.

4. The bidirectional transfer device according to claim 1, wherein the bidirectional transfer auxiliary driving assembly comprises a bidirectional transfer auxiliary driver, a second transfer transmission gear and a second transfer transmission rack; the bidirectional transfer auxiliary driver is connected to the bidirectional transfer auxiliary mounting plate, the second transfer transmission gear is connected to an output end of the bidirectional transfer auxiliary driver, and the second transfer transmission rack is connected to the bidirectional transfer arm assembly.

5. The bidirectional transfer device according to claim 1, wherein two ends of the bidirectional auxiliary push-pull component are respectively provided with at least two auxiliary push-pull connecting components, and the auxiliary push-pull connecting component protrudes from an upper side of the bidirectional auxiliary push-pull component.

6. The bidirectional transfer device according to claim 1, wherein the transfer auxiliary fixing assembly comprises two transfer auxiliary fixators, and the two transfer auxiliary fixators are arranged opposite to each other on the bidirectional transfer base.

* * * * *